Aug. 3, 1943.　　　　B. M. NEWBROUGH　　　　2,325,971
CURRENT COLLECTOR
Filed July 28, 1941　　　　3 Sheets-Sheet 2
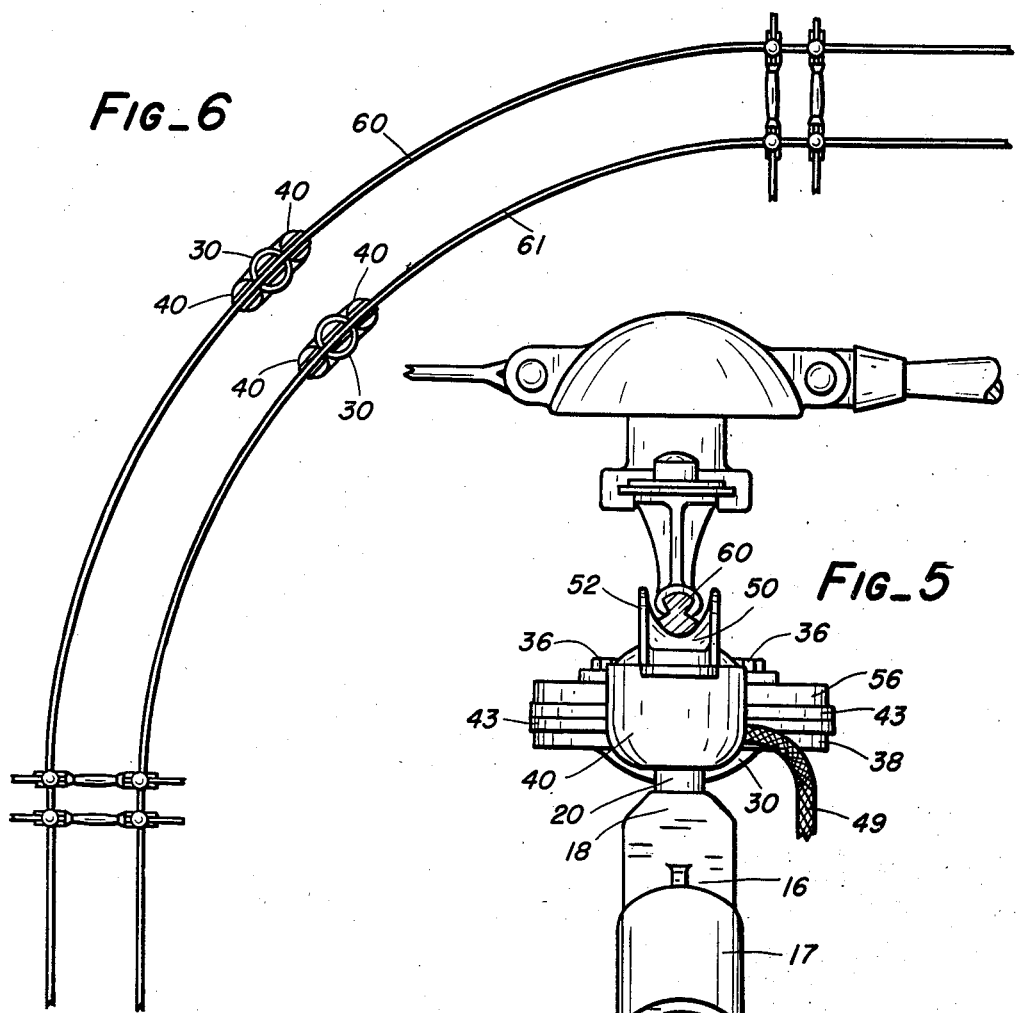
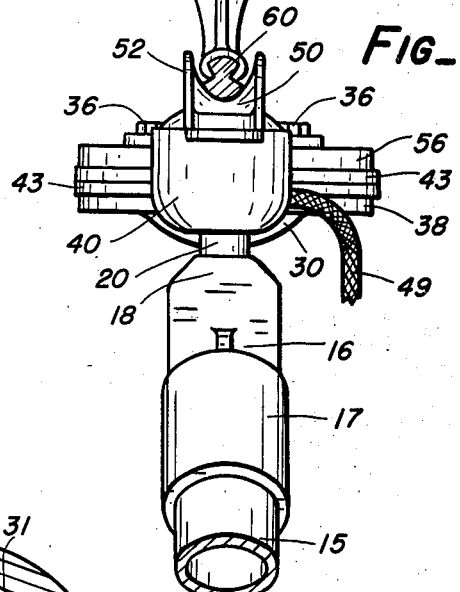
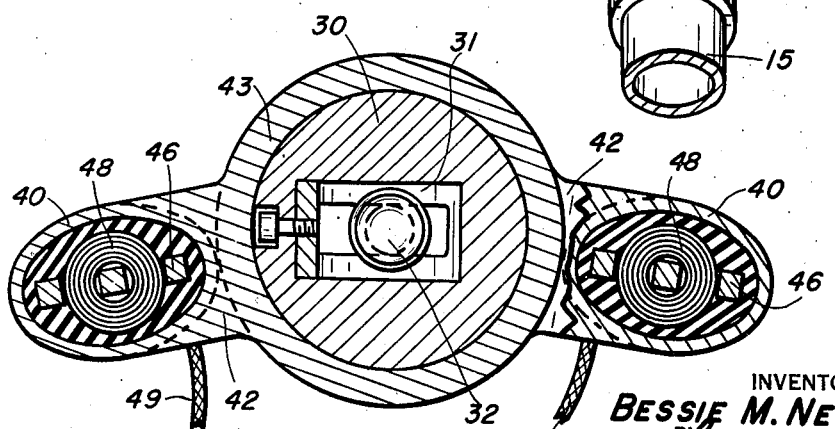
INVENTOR
BESSIE M. NEWBROUGH
BY
ATTORNEYS

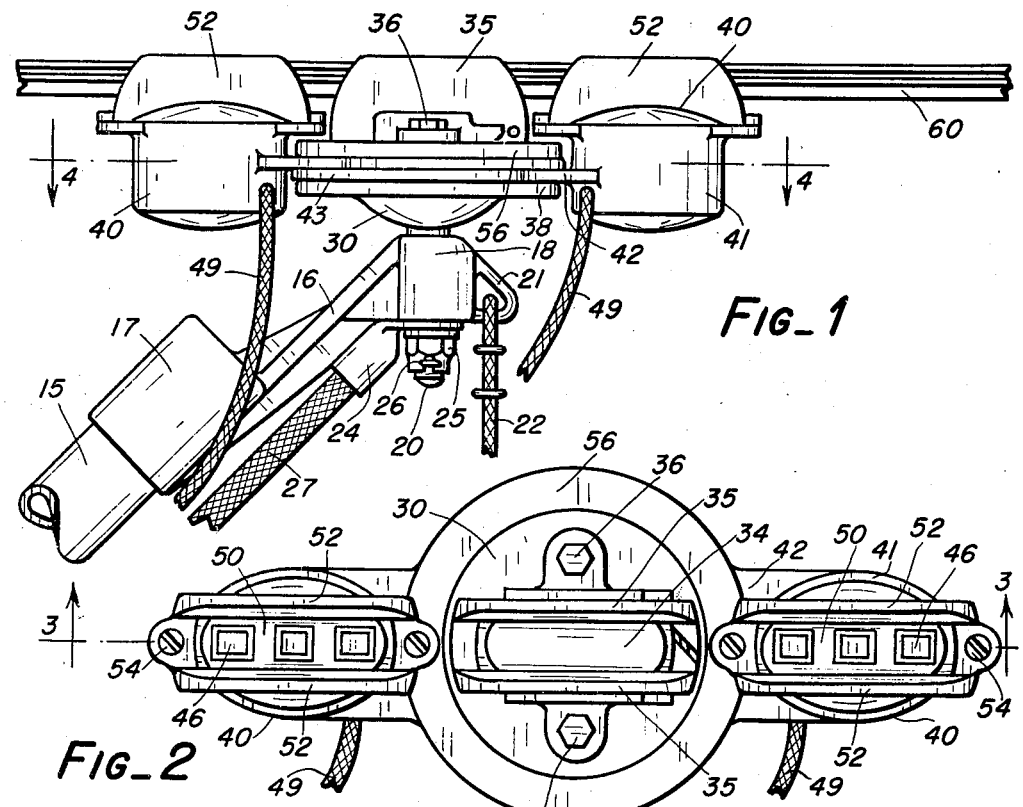

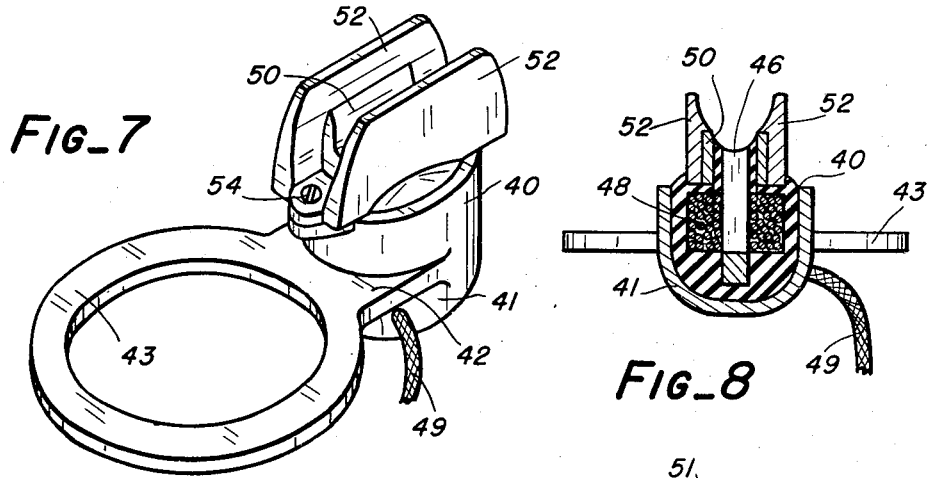
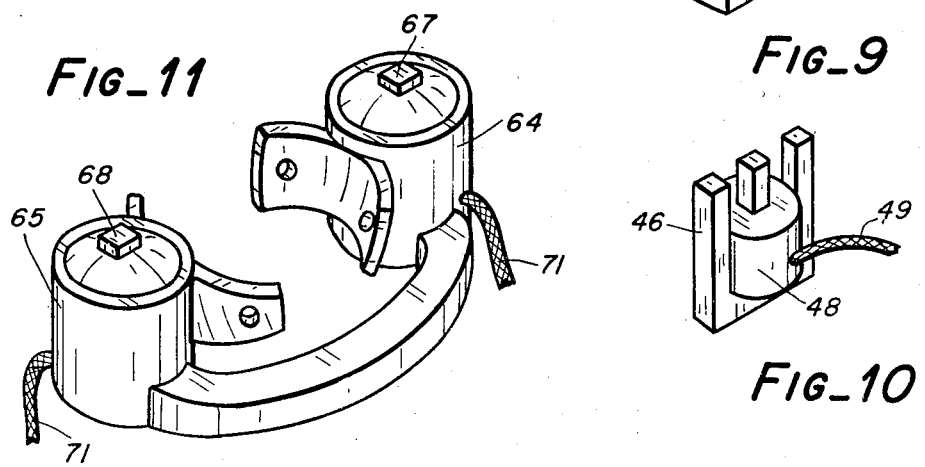
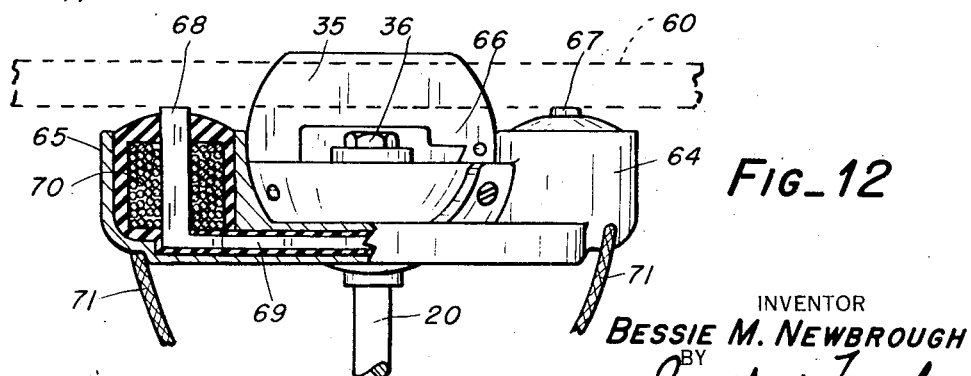

Patented Aug. 3, 1943

2,325,971

UNITED STATES PATENT OFFICE 2,325,971

CURRENT COLLECTOR

Bessie M. Newbrough, Seattle, Wash.

Application July 28, 1941, Serial No. 404,344

3 Claims. (Cl. 191—59.1)

My invention relates to improvements in a current collector and is particularly adapted for use with all types of vehicles operable upon electric current that is picked up from an overhead conduit system.

Where sharp curves or bends occur in the trolley wire to conform to the layout of the street or tracks upon which the vehicle must travel, the problem of maintaining a current collector on the trolley wire overhead has always been a difficult one to solve.

The problem has greatly increased in difficulty due to the advent of the trolley coach, a rubber-tired vehicle, that must ordinarily be provided with two collectors and under which circumstances, a double trolley wire assembly must be provided overhead.

The trolley coach runs along a street in the manner of a gas coach except that its movement is limited by the location of the overhead trolley wires. In other words, a trolley coach cannot go more than a certain distance either side of the trolley wires without disrupting service. However, due to the vagaries of traffic and due to the difficult turns caused by the confines of the street, it is quite often that the trolleys or the current collectors of the coach will come off the trolley wires and break the circuit, necessitating the labored efforts of the coach operator, or some assistant, to replace the collectors on the trolley wires. Such difficulties have never been satisfactorily solved by mechanical means because of the complex overhead structure that is required under such circumstances.

It has been a principal object of my invention to employ magnetically operable means to prevent the current collectors from jumping off the trolley wires which, in the sharp turns and more troublesome spots on the trolley wires would be made operable by providing magnetically attractive means.

A further object of my invention has been to provide a novel swiveled magnetic means cooperable with and carried by the electric current collectors of a trolley coach or similar vehicle for co-acting with magnetically attractive trolley wires or the like.

A still further object of my invention relates to the use of a swiveled tandem arrangement of magnetic means and current collector, all carried by one trolley pole and cooperable with a single trolley wire.

Another object of the invention resides in the provision of magnetic means that may be swiveled from the conventional current collector for trolley coaches to run with and to conform readily to the curvatures in overhead current collector assemblies.

Still another object of my invention relates to the provision of an improved current collecting means for trolley coaches having magnetic means associated therewith all of which may be readily manufactured and installed with extreme convenience and without the necessity of converting and avoiding the necessity of materially altering the present practice in such equipment.

A still further object of the invention has been the provision of simple efficient means operable under all kinds and manner of weather conditions, and the like to assist in maintaining the current collector on the trolley wire.

Other objects and advantages of the invention will be apparent during the course of the following description wherein I have illustrated a preferred form of my invention and a modified form of the invention.

In the drawings:

Figure 1 is a side elevational view of the preferred form of current collector and magnetically operable means that I employ for maintaining the collector on the trolley wire.

Figure 2 is a plan view of the mechanism of Figure 1,

Figure 3 is a longitudinal, sectional view as though taken on line 3—3 of Figure 2, Figure 4 is a sectional view taken on line 4—4 of Figure 1, Figure 5 is a head-on elevational view of the mechanism of Figure 1, Figure 6 is a typical plan view of the double trolley wire overhead assembly as employed in a curve arrangement, Figure 7 is a perspective view of a swivel magnetic head employed for maintaining the current collector in place on a trolley, Figure 8 is a vertical, sectional view taken through a magnetic head as of Figure 7, Figure 9 is a perspective view of the carbon shoe employed in the magnetic head, Figure 10 is a perspective view of the magnet of the head of Figure 7 as though removed from its enclosing cup, Figure 11 is a perspective view of a modified form of magnetic means that I employ, in this instance for direct coupling with the current collector, and Figure 12 is an elevational view with portions broken away for convenience of illustrating the general arrangement of the magnetic means of Figure 11 as though attached to a current collector.

Referring to the drawings, throughout which like reference characters indicate like parts, the numeral 15 designates a trolley pole generally of tubular construction having fastened on the upper end thereof the swivel arm which is provided with a barrel 17 to slip over the free end of the pole 15 and hold the arm in place. Pole 15 is normally biased upwardly by a spring mounting means so that a current collector mounted on its upper end will always be present against an overhead trolley wire. The swivel arm 16 is provided with a head 18 that carries the swivel pin 20. A tie down loop 21 to which is fastened the tie down cord or rope 22 extends from the rear of the head in a manner readily accessible when it is necessary to remove the current collector from the trolley wire.

The electrical clip 24 is fitted over the lower end of the swivel pin 20 and the pin 20 and the clip 24 are maintained in place on the head 18 by means of a nut 25 that is locked in place by the cotter pin 26. A current conductor wire 27 electrically connected to the clip 24 conveys current from the collector member to the operating mechanism of the vehicle on which the device is installed.

The collector head 30 is fitted over the upper end of the swivel pin 29 and the groove 31 engages the flanged swivel cup 32 so that the head may freely turn and rock on the pin 20 to conform to various contours in the trolley system. Preferably, a carbon shoe 34 is clamped in place in guide flanges 35 that are mounted on the collector head and held in place by means of the bolts 36.

The collector head 30 is generally circular in shape and is provided with a peripheral annular flange 38.

Referring now to Figure 7, a magnetic head 40 comprising a cup 41 provided with a laterally extending swivel arm 42 which has the relatively large circular swivel ring 43 is associated with the collector head of the trolley mechanism. The ring 43 is of a size sufficient to fit around the collector head and to rest on the flange 38 as can be clearly seen in Figure 3.

A pair of the magnetic heads 40 are swiveled to each collector head, one before and one behind the collector, and it will be seen that they travel with the collector and rock on the pin 20 in exactly the same manner as the collector does and that they are also swiveled with relation to the collector about the axis of the rotation of the collector itself.

In the form of the invention illustrated in Figures 1, 2, and 3, particularly, a pair of the magnetic heads are arranged fore and aft with relation to the current collector and their rings 43 being slipped over the body of the collector to rest upon the flange 38, and they are retained in place by means of the lock ring 56 which is threadedly engaged on the head and is held securely against dislodgement by means of the lock screw 57.

In the longitudinal sectional view of Figure 4, the swiveling arrangement of the magnetic head in connection with the collector head is clearly illustrated.

The magnetic cup 41 has in its interior a triple arm magnetic core 46 which in the drawings is shown as having the center arm encircled by a wire coil 49. This whole assembly is insulated in a suitable manner from the cup 41. When current is applied to the wires 48 a magnetic flux is created in the core 46 and flows across between the free ends of the core.

A carbon shoe 50 provided with a plurality of openings 51 fits over the arm of the magnet and is retained in place on the cup 43 by means of the flanged guide head 52 that is secured to the cup 41 by screws 54.

Suitable electrical conductors 49 connect between a source of electrical current and the wires 48 of the magnet head.

In a typical installation at those points in the overhead trolley wire construction, where it has been found necessary or thought desirable to prevent the disruption of service by the current collector coming off the trolley, magnetically attractive conductor wires, or trolley wires, 60 and 61 are provided so that automatically, as the collector in its travel on the trolley wire comes to a difficult curve, for example, the energized magnetic head will cooperate with the magnetically attractive current conductor and the two will be held together with a sliding contact during the traverse of the collector over the difficult points. It does not appear to be necessary to provide a great amount of magnetic force but only sufficient to resist dislodgement as it begins and to thus prevent forward speed or centrifugal force from "throwing" the current collector from the trolley wire.

In the case of sharp curves and the like, through the swivel arrangement provided by the rings 43 swiveling around the collector head 30 the magnetic mechanism and the collector will conform to practically any curve to be encountered.

In the modified form of my invention shown in Figures 11 and 12, a single pole magnetic head 64 and 65 is arranged on either side of the current collector as 66 in Figure 12. A single pole 67 and 68, respectively, in the heads 64 and 65 is connected by a side arm 69 and each of the arms 67 and 68 are encircled by a coil of wire 70 so that when energy applied through the conductor 71 is pulled through the wires, the magnetic flux will be produced which will serve in the manner above described.

Suitable insulation is shown for the electromagnet. It is apparent, of course, that the collector head 66 is swiveled on the conventional swivel pin 20 and that the operation of the mechanism is otherwise exactly the same as that where a plurality of magnets is employed.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. The combination with a current collector for an electric trolley vehicle and including a collector head having an encircling channel, of front retainer means and rear retainer means positioned in tandem relation with said collector head, each said retainer means having a bearing ring swiveled in the encircling channel on the circular collector-head whereby said retainer means may swivel axially of said head but only in a plane at right angles to the axis of said collector head, each said retainer means including electro-magnetic means mounted to travel in contact with a conductor wire, and an electrical connection from said electro magnetic means to a source of electrical supply.

2. The combination with a current collector for an electric trolley vehicle including a collector-head mounted to oscillate in a vertical plane and swiveled to turn in a horizontal plane, said head having an encircling channel, of retainer means having a ring fitted in said channel on the current collector head, whereby said retainer means may swivel axially of said head but only at right angles to the axis of said collector-head, said retainer means including electro-magnetic means mounted to travel in contact with a conductor wire, and an electric connection from the electro-magnetic means to a source of electrical energy.

3. The combination with a current collector having a bearing head, an upright swivel pin mounted in the head, and a collector-head having an oscillatable and swivelled mount on the pin; of a retainer member having a horizontal swivel connection with the collector-head whereby it may only be swung axially of said pin at right angles thereto, electro-magnetic means included in the retainer to travel in contact with a conductor wire, and an electrical connection from the electro-magnetic means to a source of electrical energy.

BESSIE M. NEWBROUGH.